United States Patent [19]

Bussinger

[11] Patent Number: 5,090,513
[45] Date of Patent: Feb. 25, 1992

[54] POWERED WHEELED VEHICLE FOR THE HANDICAPPED AND OTHERS DESIRING ASSISTANCE INCORPORATING AUTOMATICALLY LOCKING SWIVELABLE AND RAISEABLE POWERED SEAT

[75] Inventor: Allen L. Bussinger, Saginaw, Mich.

[73] Assignee: Amigo Mobility International, Inc., Bridgeport, Mich.

[21] Appl. No.: 633,024

[22] Filed: Dec. 24, 1990

[51] Int. Cl.$^5$ .............................................. A61G 5/04
[52] U.S. Cl. ................................... 180/271; 74/89.15; 192/141; 248/161; 180/907
[58] Field of Search ............... 180/907, 208, 271, 273; 74/89.15; 192/141; 248/161, 157; 403/96

[56] References Cited

U.S. PATENT DOCUMENTS

| | | | |
|---|---|---|---|
| 3,078,946 | 2/1963 | Young | 180/271 |
| 4,019,602 | 4/1977 | Habiger | 180/273 |
| 5,020,624 | 6/1991 | Nesterick et al. | 180/208 |

FOREIGN PATENT DOCUMENTS

| | | | |
|---|---|---|---|
| 338689 | 10/1989 | European Pat. Off. | 180/907 |
| 93244 | 7/1897 | Fed. Rep. of Germany | 403/96 |
| 1064219 | 8/1959 | Fed. Rep. of Germany | 248/161 |

Primary Examiner—Charles A. Marmor
Assistant Examiner—Karin Tyson
Attorney, Agent, or Firm—Learman & McCulloch

[57] ABSTRACT

A steerable electrically powered three-wheeled vehicle has an upstanding seat post mounting a seat thereon. The seat post is telescopically and revolvably received in a seat post support fixed to the frame of the vehicle. A seat motor is provided on the vehicle which has a drive connection to the seat post assembly for raising and lowering it and there is a control on the vehicle for selectively operating the seat motor forwardly or reversely to raise or lower the seat post and seat. A pair of master lock parts are provided, one on the seat post support and the other on the seat post, and parts on the respective lock parts are automatically engaged when the seat post and seat are lowered to lowered position for locking the otherwise relatively revolvable parts against relative rotation. The lock parts automatically prevent operation of the motor driving the vehicle, unless the seat is in the forward facing position. The clutch and drive gear assembly are so configured as to prevent undue noise when the clutch slips at the limits of vertical travel of the seat post and seat.

14 Claims, 4 Drawing Sheets

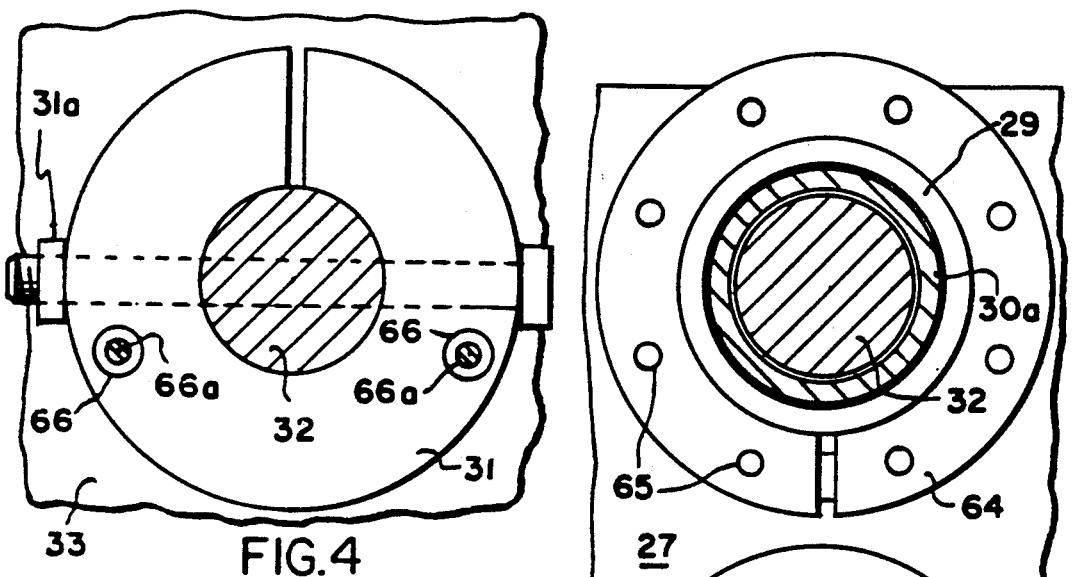
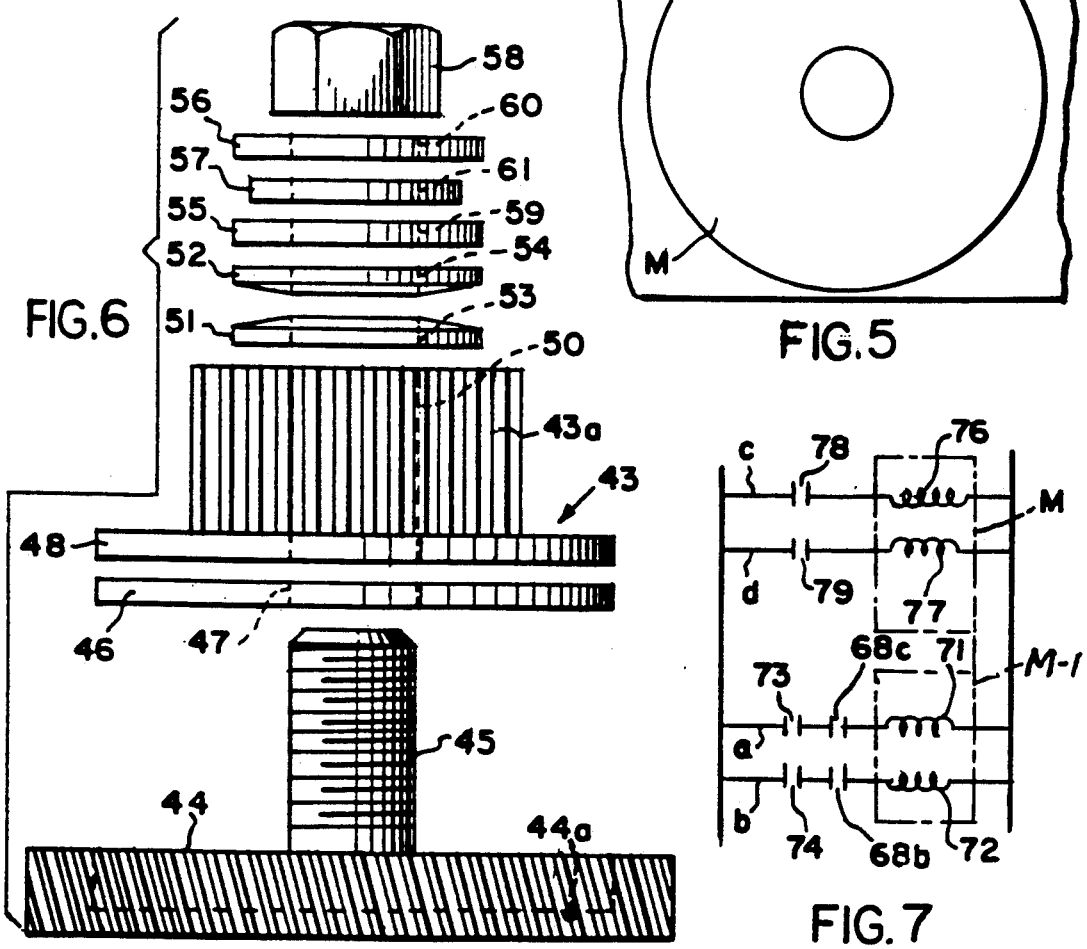

POWERED WHEELED VEHICLE FOR THE HANDICAPPED AND OTHERS DESIRING ASSISTANCE INCORPORATING AUTOMATICALLY LOCKING SWIVELABLE AND RAISEABLE POWERED SEAT

BACKGROUND OF THE INVENTION

Steerable, electrically powered, three wheeled vehicles of the type disclosed in the present assignee's U.S. Pat. No. 4,846,295, which is incorporated by reference herein for any necessary purpose, have employed electrically powered, swivelable, vertically adjustable post supported contour chairs which have been manually locked in position by hand operated levers. The locking occurred as a result of locking linkage going to an over center position. Various prior art patents, as set forth hereinafter, have provided safety switches and the like for the automatic deactivation of a motor vehicle. U.S. Pat. No. 4,795,865, for example, provides a switch under the seat which is closed when the operator is seated in the seat and permits the vehicle to be operated. In the event the operator steps from or is thrown from the seat, force applied to the actuator by a spring is sufficient to open the switch thereby deactivating the vehicle engine. U.S. Pat. No. 4,274,503 discloses a seat post which is moved upwardly and downwardly by an electric motor through the position of gearing and screw nut mechanism. Other prior art patents are as follows:

| | |
|---|---|
| 3,500,946 | Boyajian |
| 4,274,503 | Mackintosh |
| 4,285,418 | Paine |
| 4,392,543 | Buckhouse et al |
| 4,392,544 | Dilno |
| 4,633,962 | Cox et al |
| 4,655,313 | Hicks |
| 4,795,865 | Howard |

The prior art patents identified herein, neither singularly nor combinatively, disclose the subject matter which is claimed.

SUMMARY OF THE INVENTION

The present invention is concerned with the power seat assembly which is conventionally provided on three wheeled vehicles of the type used by the handicapped and others. The vertically disposed, raisable, seat mounting post assembly is telescopically and revolvably received in a fixed seat post support as previously, and a motor is used to raise or lower the seat post and seat, as previously. In the present construction a lock part is provided on the seat post support and a second mating lock part is carried on the seat post assembly. These lock parts automatically engage when the seat post is lowered to automatically lock the seat post and seat in one of a plurality of swivelled positions. When the seat post is in raised position, the lock parts are disengaged and the seat post assembly and seat are free to freely rotate to perform desired work tasks and the like. The lock part mechanism is so constructed as to automatically prevent the owner from driving the vehicle unless the seat is in the forward facing position and the seat post assembly is in its lowermost position.

One of the prime objects of the invention is to provide a vehicle with an automatically locking seat post assembly which permits the use of a lower profile seat actuator than previously and eliminates clearance problems encountered with the previously existing, manually operated seat lock.

A further object of the invention is to provide a vehicle of the character described which permits the driver to automatically lock the seat in one of eight different angular positions, covering 360° of swiveling movement, to allow the user to position himself or herself as desired. Handicapped persons using the vehicle normally remain seated while performing a variety of tasks and functions, and require a fully swiveling seat. Moreover, in the performance of certain work tasks and functions, it is desirable that the seat occupant be able to raise the seat to various positions and then lower it to a safe down position, when it is desired to move the vehicle forwardly or rearwardly.

Another object of the invention is to provide an assembly of the character described which utilizes the locking assembly to prevent the vehicle engine from moving the vehicle forwardly and rearwardly, unless the seat is in its lowermost position and the seat is in its front forward facing position.

Still another object of the invention is to provide a clutch for the vehicle actuator which is less noisy in operation.

Other objects and advantages of the invention will be pointed out specifically or will become apparent from the following description when it is considered in conjunction with the appended claims and the accompanying drawings.

DESCRIPTION OF THE DRAWINGS

In the drawings.

FIG. 4 is a fragmentary, sectional, underplan view taken on the line 4—4 of FIG. 2.

FIG. 5 is a fragmentary, sectional, top plan view taken on the line 5—5 of FIG. 2.

FIG. 6 is an exploded elevational view of the drive clutch plate and associated parts; and FIG. 7 is a schematic electrical control diagram.

Figure 1:
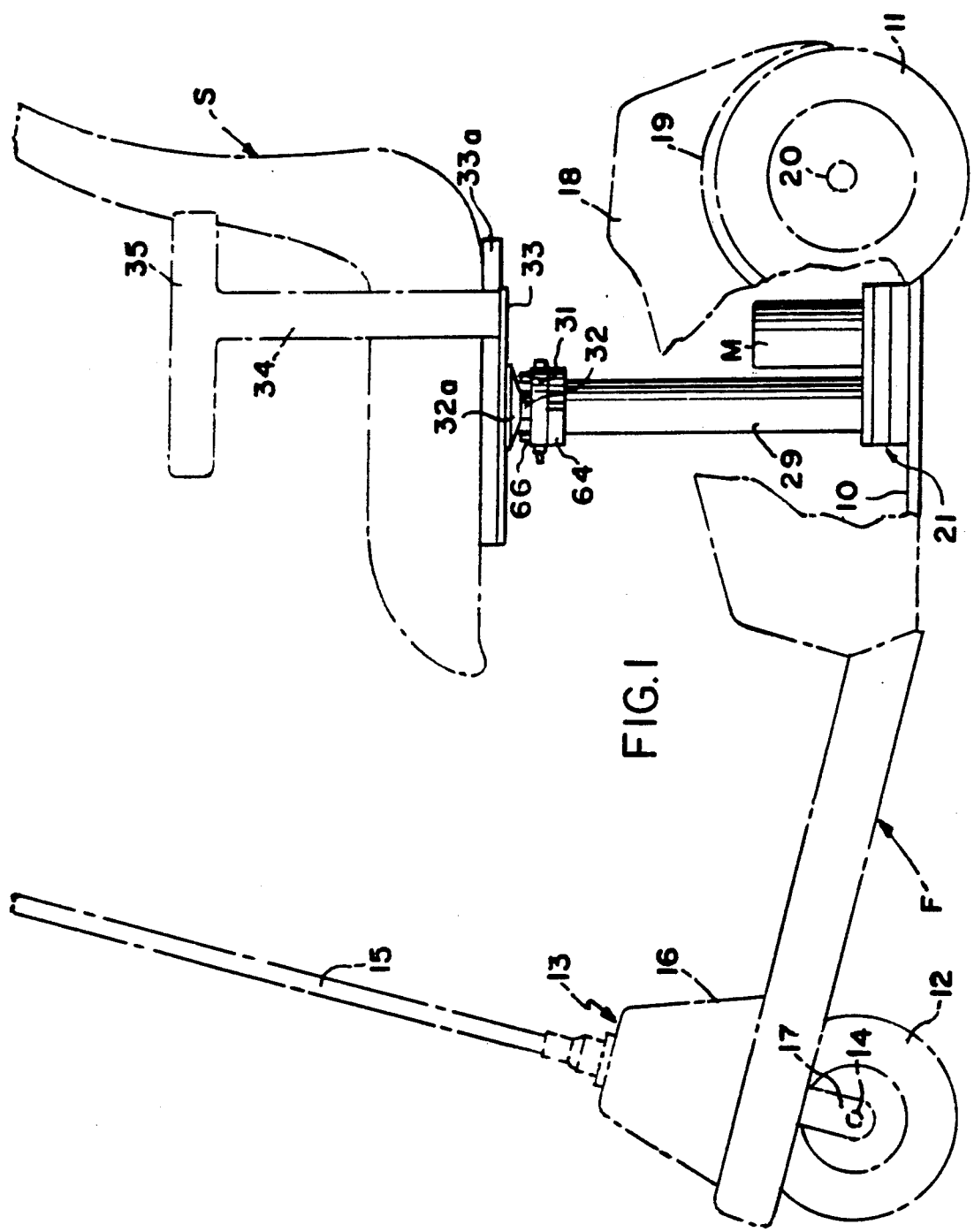
FIG. 1 is a side elevational view of the vehicle with portions thereof broken away to show the seat post actuator mechanism.

Referring now more particularly to the accompanying drawings, the motorized wheelchair or vehicle comprises a preferably lightweight aluminum frame, generally designated F, which is shown only schematically and includes a floor plate 10. The vehicle may be considered to be the rear drive vehicle generally described in U.S. Pat. No. 4,846,295 which is a three-wheeled vehicle having a pair of rear wheels 11 and a front wheel 12 of smaller diameter. The front wheel assembly, generally designated 13, includes a front axle 14, supporting a steerable post member 15 which is journaled in a front wheel casing 16 and connected to the wheel fork member 17. Start, stop, forward, reverse and speed controls may be conveniently provided on the upper end of the steering post 15, adjacent handlebars in the usual manner, so as to be readily manipulatable by the vehicle occupant. As in the patent mentioned, an inverted shell-like enclosure or housing 18, having integral rear fenders 19 and affixed to and forming part of the frame F, houses or encases the reversible electric drive motor M-1 (see FIG. 7) which has a drive pulley connected to the differential rear axle on which the rear wheels 11 are mounted.

As previously, the frame F includes a gear drive housing 21 for raising and lowering a seat S, fixed to floor board 10. Housing 21 includes a lower wall 22 and all upper wall 23, connected by side walls 24 and front and rear walls 25 and 26 respectively. Plate 27, supported on the housing top plate 23, supports the reversible electric motor M and a socket 28 for a fixed sleeve 29, within which the tubular seat post assembly generally designated 30 is telescopically received. A collar or plate 31 is fixed to the upper end of the sleeve 30a which forms a part of assembly 30 and is raised upwardly and pulled downwardly in the fixed sleeve 29 in a manner which will presently be described. Collar 31 fixes to a post 32, also forming a part of the seat post assembly 30, which is received within the tube 30a. Head 32a provided on the post 32 supports the seat S which includes a plate 33 (FIG. 1) with armrest straps 34 and armrests 35. Plate 33 supports further the plate 33a on which the contour seat S is fixed.

Staked or pinned to the tube 30a as at 36, is a nut 37 which, when raised or lowered, raises or lowers sleeve 30a and the seat S. The sleeve 30a, and accordingly the nut 36, are prevented from rotating by a key 38 carried by the stationary sleeve 29, there being a slot 30b provided in the seat post assembly sleeve 30a which prevents rotation of the sleeve 30a, while permitting sleeve 30a to be raised and lowered vertically.

It will be noted that the nut 37 is internally threaded as at 37a to receive a screw 39, mounted on a screw shaft shaft 40 which is supported by a thrust bearing 41 within casing 21. The screw 39 has a bearing washer 39a fixed to its upper end. Provided within housing 21 and fixed to shaft 40 is a spur gear 42 which is in mesh with a gear assembly 43a forming a part of a clutch and gear mechanism generally designated 43. As FIG. 6 particularly indicates, mechanism 43 includes steel bevel gear 44 with an integral threaded upright post 45 upon which a clutch plate 46 with an opening 47 can float upwardly and downwardly on the post 45, and rotate with respect thereto. In bearing engagement with the high coefficient of friction composition (i.e. in the neighborhood of 0.47–0.50) clutch plate 46, but not adhered thereto, is a plate 48 forming part of and integrated with spur gear assembly 43a which meshes with the gear 42. It is important to note that the steel plate 48 has a completely flat lower face which mates with the completely flat upper face of clutch plate 46. The completely flat lower face of clutch plate 46 mates with the completely flat bottom surface of a recess 44a which receives the plates 46 and 48 when the parts are in assembled position. Clutch plate 46 is available from Thomas Manufacturing Company of Tallmadge, Ohio. The integrated plate 48 and gear 43a have an opening 50 and are similarly moveable upwardly and downwardly on threaded post 45 and revolvable with respect thereto.

Provided on post 45 above gear assembly 43a are a pair of oppositely disposed disc springs 51 and 52, each having openings 53 and 54 to receive the post 45, and above the disc springs 51 and 52, on post 45, are washers 55 and 56, spacer 57 and a hex nut 58. The washers 55 and 56 have openings 59 and 60 of a size to be freely received on the post 45 as does the spacer 57 at 61. Nut 58, threads down on the upper end of the threaded post 45 and is tightened down to compress the disc rings 51 and 52 to squeeze the plate 48 against clutch plate 46, and in turn squeeze clutch plate 46 against the upper surface of gear 44 with a predetermined pressure. The torquing pressure is such that the assembly 43, between the uppermost and lowermost positions of the sleeve 30a smoothly, without slipping, raises the post tube 30a and seat S. When the uppermost or lowermost position is reached, slippage occurs at the clutch plate 46 and the drive is not transmitted to gear 42. The construction noted, wherein the flat surfaces are provided on the clutch plate and plate 48 and the plate 46 floats, eliminates the undue noise formerly encountered in a past construction which did not have these features. The bevel gear 44 is driven by a bevel gear 62 journaled in a bearing 63 provided in housing top plate 23, gear 62 being coupled in an acceptable manner to the armature shaft of motor M.

Fixed to the upper end of stationary sleeve 29 is a lock ring or collar 64 which, as FIG. 5 indicates, has a series of eight openings or recesses 65 spaced at 45° intervals. Upper collar 31, which is secured to the post 32 by the nut and bolt assembly 31a, carries a pair of dependent posts 66 which are received in threaded openings 67 provided in the collar 31, and have reduced dependent post ends 66a of a size to be freely received in the openings 65.

Figure 2:
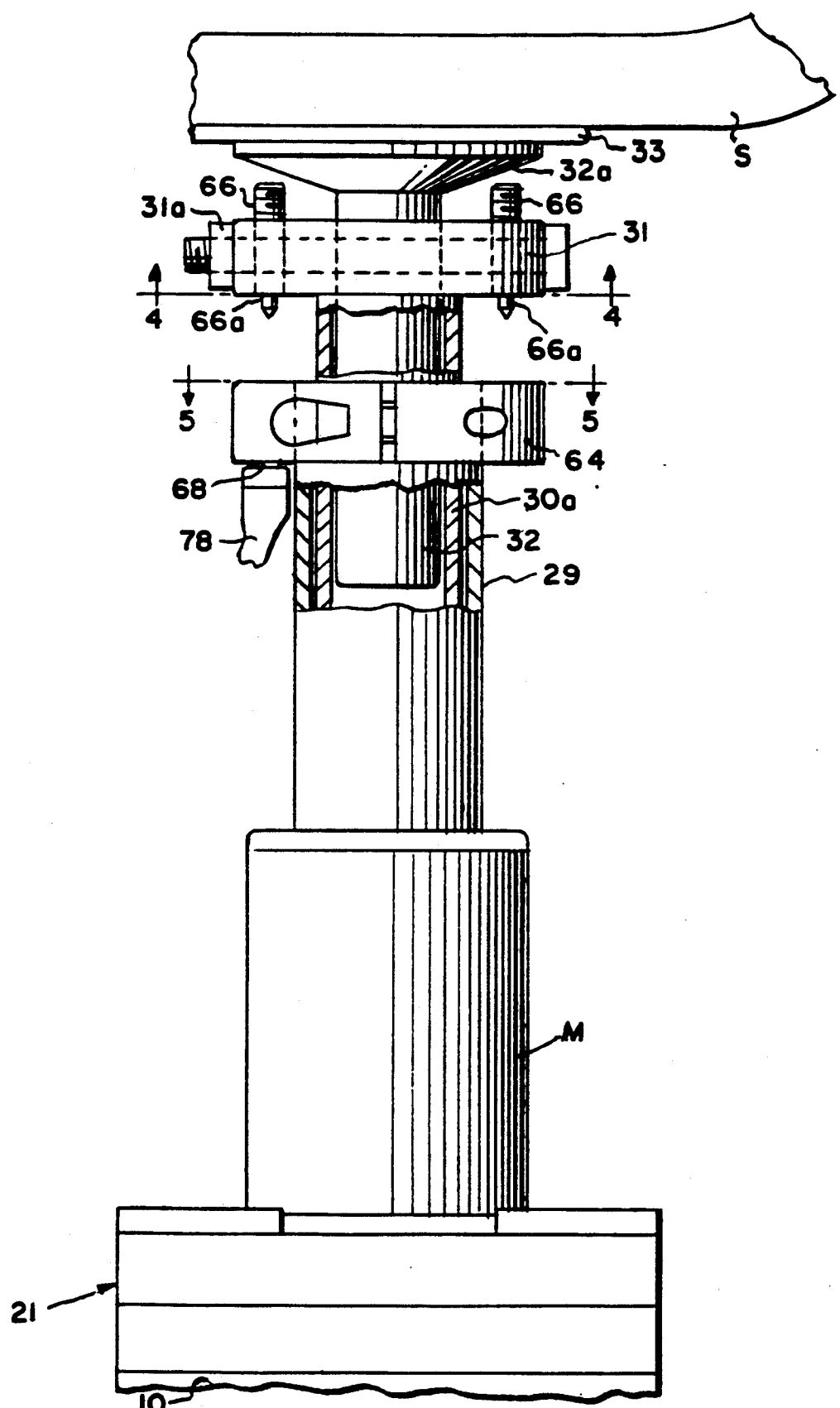
FIG. 2 is an enlarged, fragmentary, rear elevational view of the actuator and seat post assembly with the seat shown in a raised unlocked position, parts being broken away to better illustrate the construction.
Figure 3:
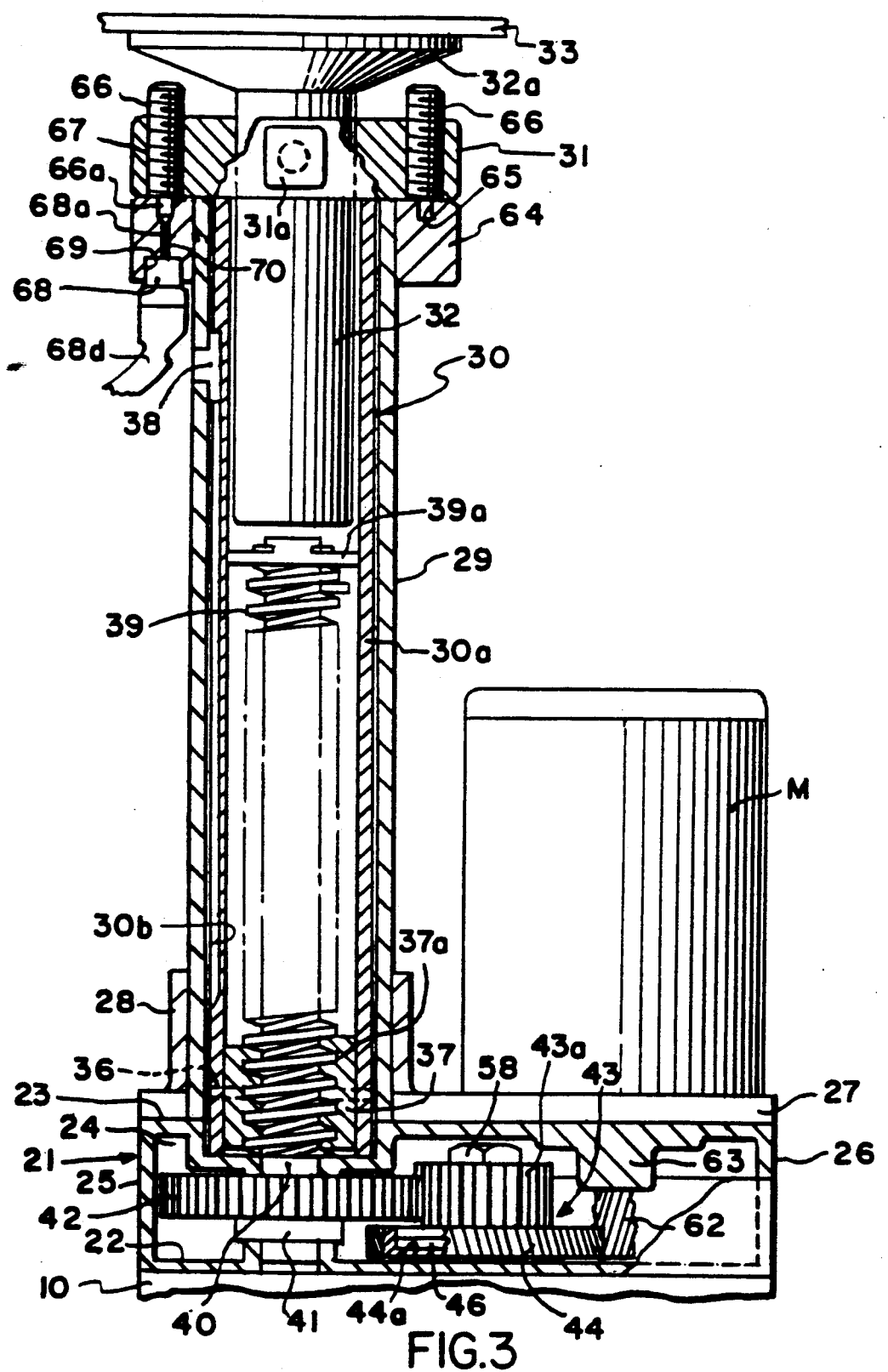
FIG. 3 is a sectional, fragmentary, side elevational view with the seat shown in lowered, locked position.

The spacing of pins 66a is such that they are received in any pair of the openings 65 which are 135° apart. Thus, when seat S and ring 31 are lowered from the position in which they are shown in FIG. 2 to the position in which they are shown in FIG. 3, the pin ends 66a seek and find the openings 65. Depending upon the swivelled position of seat S, the pins 66a tend to seek a seated position in the openings 65 because of the weight of the seat occupant, and this seeking can be assisted by slight shifting of the rotary position by the seat occupant.

As FIGS. 2 and 3 particularly illustrate, a limit switch 68 having a switch actuating depressable plunger 68a, is mounted in an opening 69 provided under one of the recesses 65. Plunger 68a extends up through an opening 70 provided in the ring 64 into the opening 65.

When the Seat S is in the straight ahead position, with its front edge perpendicular to the longitudinal axis of the vehicle, one of the posts 66 will be received in the opening 65 which is in communication with the opening 70 and, when received will depress the switch plunger 68a to close the sets of contacts associated with switch 68.

FIG. 7 schematically portrays an electrical circuit with the forwarding and reversing coils 71 and 72 respectively of the motor M1, which drives the vehicle, these coils being shown in circuit lines a and b. In each of the circuit lines a and b, respectively, is one of the vehicle cannot be moved forwardly and rearwardly, unless plunger 68a is depressed and contacts 68b and 68c are closed. The wires leading from switch 68 are safely encased in a conduit 68d which is flexible and leads to motor M1. Also provided in the circuit lines a and b, respectively, are on-off contacts 73 and 74 which are under the control of the operator at the handlebars and permit him or her to decide in which direction to move the vehicle.

In circuit lines c and d respectively are the contacts 78 and 79 controlled by the on-off switch also provided at the handlebars for each of the forwarding and reversing coils 76 and 77 respectively, of motor M. With this control the operator can, at will, close either the contacts 78 in circuit line c or the contacts 79 in circuit line d to energize motor M to raise or lower seat S respectively.

THE OPERATION

With a vehicle in a halted position, where the seated occupant is to perform a work task but needs to be elevated to reach something, it is only necessary for the operator to engage the switch 78 and energize the forwarding circuit 76 of motor M to drive gear 62, and, through the gearing disclosed in FIG. 3 and described, rotate the screw 39 in a direction to cause nut 37 and seat post assembly 30 to raise a desired distance. In doing so, the lock ring 31 is raised sufficiently to remove the pins 66 from the openings 65 in which they are engaged. Once this has occurred, the operator is free to swivel or rotate the seat S with respect to the longitudinal axis of the vehicle to the desired degree, and can elevate the seat S to the extent desired. When the upper limit of travel is reached the drive of gear 44 will no longer be transferred by the clutch plate 46, and this will occur without undue noise. If the seat occupant needs to lower the seat S, it is only necessary to activate switch 79 and energize the reversing circuit 77 of motor M to lower the seat via the drive of gears 62, 44, 43a, and 42, which drive screw 39 in the direction to lower nut 37 and the seat post assembly 30 and seat S. The seat S can be lowered only incrementally, or, if desired, fully. When the motor M is driven sufficiently to completely lower seat S, the ends 66a of the posts 66 tend to seek and snap into the nearest set of opposed spaced apart openings 65 in which they can be accommodated. If, one of these openings happens to be the opening in which the upper end of switch plunger 68a is received, because the seat S is in the forwardly facing position, it will be possible for the operator to drive the vehicle forwardly or rearwardly. For safety sake, the vehicle cannot be operated, unless the seat S is in this forwardly facing position.

Although preferred embodiments of the invention have been illustrated in the accompanying drawings and described in the forgoing detailed description, it will be understood that the invention is not limited to the embodiments disclosed, but is capable of numerous rearrangements, modifications and substitutions of parts and elements without departing from the spirit of the invention which is defined in the following claims.

What is claimed is:

1. In combination with a powered wheeled vehicle for the handicapped and others desiring assistance and, having a longitudinal frame mounting motor means for driving one or more of the vehicle wheels, an upstanding, swivellable and raisable seat on said frame:
   a. a generally vertically disposed seat post mounting a seat thereon;
   b. a seat post support fixed to said vehicle to telescopically and revolvably receive said post;
   c. seat motor means on said vehicle having a drive connection to said seat post for raising and lowering it;
   d. control means on said vehicle for selectively operating said seat motor means to raise or lower said seat post;
   e. a lock part on said seat post support and a second mating lock part carried with said seat post to move vertically with said seat post; and
   f. means on said lock parts engageable when the seat post is in lowered position for locking said parts and thereby said seat post and seat in any one of a plurality of relatively rotated positions relative to said seat post support, while disengaged to free said seat post parts and seat to freely rotate when the seat post is in a raised position.

2. The combination defined in claim 1 wherein said seat has a back and, in one locked position of said lock parts, faces forwardly with the seat front edge positioned perpendicularly to the longitudinal axis of said frame, and means on said lock parts automatically prevents operation of said motor means to drive the vehicle unless the seat is in the forward facing position on the vehicle and the seat post is in lowermost position.

3. The combination defined in claim 1 wherein said seat motor means comprises a reversible electric motor having an output shaft with a gear thereon, and screw and nut means connected to move said seat post vertically is driven by said gear.

4. The combination defined in claim 1 wherein said lock part for the seat comprises a collar fixed to said seat post, and said second lock part comprises a collar fixed to the upper end of the seat post support, one of said collars having a vertically protruding part and the other having a plurality of circumferentially spaced vertical openings in which said vertically protruding part may be received when the seat post is in lowered position.

5. The combination defined in claim 4 in which cooperative means, associated with said protruding part and one only of said openings, prevents operation of said motor means to drive the vehicle unless the protruding part is received in said one of said openings.

6. The combination defined in claim 5 wherein said cooperative means comprises a normally open switch, connected with said motor means for driving the vehicle to normally disable it, which closes with reception of said protruding part in said one opening.

7. The combination defined in claim 1 wherein said lock part for the seat comprises a vertically protruding part and said lock part for the seat post support comprises a member having a plurality of circumferentially spaced vertical openings in which said vertically protruding part may be received dependent on the rotary position of the seat when the seat post is in lowered position.

8. The combination defined in claim 7 wherein a pair of said protruding parts depend from the seat at 135° intervals, and said openings are provided in multiple pairs, with the openings of each of said pairs spaced 135° apart.

9. The combination defined in claim 1 wherein said seat post motor means comprises axially movable, rotatably fixed screw means fixed to said seat post and received by an axially restrained rotatable nut provided in association with said seat post support; and reversible electric motor means is connected to drive said screw means and nut.

10. The combination defined in claim 9 wherein flat surfaced clutch plate and mating flat surfaced gear drive plate means is integrated with said reversible electric motor means for driving said nut.

11. In combination with a powered vehicle for the handicapped and other desiring assistance and having frame mounting motor means for driving one or more of the vehicle wheels and an upstanding swivelable and raiseable seat on the frame,
   a. a generally vertically disposed seat post mounting a seat thereon, b. a seat post support fixed to said vehicle to telescopically and revolvably receive said post, c. seat motor means on said vehicle having a drive connection to said seat post for raising and lowering it, d. control means on said vehicle for selectively operating said motor means to raise or lower said seat post; and e. a clutch and gear assembly interposed between said motor means and drive connection, said assembly comprising a drive gear driven by the motor and having a vertically protruding post, a clutch plate on said post carried by the drive gear and having a flat upper face, a driven gear assembly having driving plate with a flat surfaced lower face portion mounted on said post for mating driving engagement with the upper face of said clutch plate, and means for creating a predetermined pressure normally urging said clutch plate and gears into an overcomeable friction drive relationship.

12. The combination defined in claim 11 wherein said clutch plate has a flat surfaced lower face mating with a like flat surface on said drive gear and is floatingly received on said post.

13. A method of automatically locking a raisable seat for a vehicle for the handicapped and others desiring assistance and having a frame extending along a longitudinal axis, a seat post support, with a seat post supporting said seat, telescopically and rotatably received thereby, a seat post motor connected to raise and lower said seat post and seat, a vertically extending locking protrusion carried on one of the seat post and seat post support and a member with vertical openings carried by the other for receiving the protrusion when the seat post and seat are in lowered position, comprising the steps of:

a. raising said seat post and seat relative to said seat post support to move said protrusion out of the opening in which it is received; and b. swiveling said seat post and seat angularly relative to said seat post support and lowering said seat post and seat and positioning said protrusion in a different one of said openings to lock said seat in angularly displaced position relative to said axis.

14. The method of claim 12 wherein said vehicle is driven forwardly and rearwardly by a vehicle drive motor system having a control circuit enabling forward and rearward movement, a normally open switch is provided in association with only one of said openings to be activated only when the said one opening receives the protrusion, the protrusion being receivable in said one opening only when the seat is facing forwardly with its front edge perpendicular to said longitudinal axis; and a. said seat post and seat are raised relative to said seat post support to move said protrusion out of the opening in which it is received;

b. said seat post and seat are swiveled and lowered to a position in which said protrusion is received in said one opening;

c. said control circuit enabling operation of said vehicle forwardly and rearwardly is made; and d. said vehicle is driven.

* * * * *

UNITED STATES PATENT AND TRADEMARK OFFICE
CERTIFICATE OF CORRECTION

PATENT NO.  : 5,090,513
DATED       : February 25, 1992
INVENTOR(S) : Allen L. Bussinger It is certified that error appears in the above-identified patent and that said Letters Patent is hereby corrected as shown below:

Column 4, line 54, after "the" (second occurrence) insert -- two contacts 68b and 68c provided by switch 68. Thus the --.

Cancel claims 10-12.

Column 8, line 13, change "12" to -- 13 --.

Signed and Sealed this

Twenty-second Day of June, 1993

Attest:

MICHAEL K. KIRK

Attesting Officer

Acting Commissioner of Patents and Trademarks